United States Patent [19]

Torii

[11] Patent Number: 4,771,174
[45] Date of Patent: Sep. 13, 1988

[54] RADIATION IMAGE RECORDING AND READ-OUT APPARATUS

[75] Inventor: Shumpeita Torii, Kanagawa, Japan

[73] Assignee: Fuji Photo Film Co., Ltd., Kanagawa, Japan

[21] Appl. No.: 72,491

[22] Filed: Jul. 13, 1987

[30] Foreign Application Priority Data

Jul. 11, 1986 [JP] Japan .................................. 61-163374

[51] Int. Cl.⁴ ............................................ G01T 1/105
[52] U.S. Cl. .............................. 250/327.2; 250/484.1; 271/3.1
[58] Field of Search .................... 250/327.2, 484.1; 378/173, 172; 271/3.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,640,507 | 2/1987 | Ohgoda et al. | 271/245 |
| 4,704,529 | 11/1987 | Ohgoda et al. | 250/327.2 |

FOREIGN PATENT DOCUMENTS 0011395  2/1981  Japan .................................. 250/327.2

Primary Examiner—Janice A. Howell
Assistant Examiner—Constantine Hannaher
Attorney, Agent, or Firm—Sughrue, Mion, Zinn, Macpeak & Seas

[57] ABSTRACT

A radiation image recording and read-out apparatus comprises an image recording section provided with a cassette holder for releasably holding a cassette capable of housing a stimulable phosphor sheet therein at a position for recording a radiation image on the stimulable phosphor sheet by exposing the stimulable phosphor sheet in the cassette to a radiation, and a device for taking out the stimulable phosphor sheet from the cassette. The apparatus also comprises an image read-out section for detecting light emitted by the stimulable phosphor sheet scanned with stimulating rays to obtain electric image signals, an erasing section for releasing radiation energy remaining on the stimulable phospor sheet after image read-out, and a system for receiving the stimulable phosphor sheet from the sheet take-out device at the image recording section, conveying the stimulable phosphor sheet to the image read-out section and the erasing section, and then feeding the stimulable phosphor sheet into the cassette held at the image recording section.

8 Claims, 2 Drawing Sheets

RADIATION IMAGE RECORDING AND READ-OUT APPARATUS

BACKGROUND OF THE INVENTION

1. Field of the Invention

This invention relates to a radiation image recording and read-out apparatus for exposing individual stimulable phosphor sheets to a radiation passing through an object to have a radiation image of the object stored thereon, exposing the individual stimulable phosphor sheets to stimulating rays which cause them to emit light in proportion to the stored radiation energy, and detecting and converting the emitted light into electric signals. This invention particularly relates to a radiation image recording and read-out apparatus in which the stimulable phosphor sheets are conveyed by a circulation and conveyance means along a predetermined circulation path in the apparatus and circulated and reused for recording radiation images.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing method. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to electric image signals, which are processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing method, the stimulable phosphor sheet is used to temporarily store the radiation image in order to reproduce the final visible image therefrom on a final recording medium. For economical reasons, therefore, it is desirable that the stimulable phosphor sheet be used repeatedly.

Further, in a mobile X-ray diagnostic station such as a traveling X-ray diagnostic station in the form of a vehicle like a bus which is provided with a radiation image recording and read-out apparatus for carrying out the aforesaid radiation image recording and reproducing method and moves from place to place to record radiation images for mass medical examinations, it is disadvantageous to load the mobile X-ray diagnostic station with a large number of stimulable phosphor sheets, and the number of the stimulable phosphor sheets which can be loaded on the mobile X-ray diagnostic station is limited. Therefore, it is desired to load the mobile X-ray diagnostic station with stimulable phosphor sheets which can be used repeatedly, once store the radiation images of the objects respectively on the stimulable phosphor sheets, transfer the electric image signals read out from the stimulable phosphor sheets to a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examination. This is very advantageous in practical use.

In order to reuse stimulable phosphor sheets as described above, the radiation energy remaining on the stimulable phosphor sheet after it is scanned with stimulating rays to read out the radiation image stored thereon should be erased by a method as described in, for example, U.S. Pat. No. 4,400,619 or Japanese Unexamined Patent Publication No. 56(1981)-12599. The stimulable phosphor sheet should then be used again for radiation image recording.

From the aforesaid viewpoint, the applicant proposed in Japanese Unexamined Patent Publication No. 59(1984)-192240 a built-in type radiation image recording and read-out apparatus comprising:

(i) an image recording section for recording a radiation image of an object on a stimulable phosphor sheet by exposing the stimulable phosphor sheet to a radiation passing through the object, (ii) an image read-out section provided with a stimulating ray source for emitting stimulating rays for scanning the stimulable phosphor sheet carrying the radiation image stored thereon at the image recording section, and a photoelectric read-out means for detecting light emitted by the stimulable phosphor sheet scanned with the stimulating rays to obtain electric image signals, and (iii) an erasing section for, prior to the next image recording on the stimulable phosphor sheet for which the image read-out has been carried out at the image read-out section, having the stimulable phosphor sheet release the radiation energy remaining on the stimulable phosphor sheet, whereby the stimulable phosphor sheet is conveyed by a circulation and conveyance means, circulated through the image recording section, the image read-out section and the erasing section, and reused for radiation image recording.

The proposed built-in type radiation image recording and read-out apparatus is suitable for loading on a mobile X-ray diagnostic station such as a traveling X-ray diagnostic station in the form of a vehicle like a bus for the purpose of mass medical examinations or the like.

Besides the case where the aforesaid radiation image recording and reproducing method is carried out by use of the built-in type radiation image recording and read-out apparatus as mentioned above, the radiation image recording and reproducing method is often carried out by recording a radiation image on a stimulable phosphor sheet by use of an image recording apparatus for conducting only the image recording, taking the stimulable phosphor sheet out of the image recording apparatus, feeding the stimulable phosphor sheet to an image read-out apparatus independent from the image recording apparatus, and reading out the radiation image stored on the stimulable phosphor sheet. In the latter case, the stimulable phosphor sheet is subjected to image recording in the image recording apparatus in the form housed in a radiation-permeable, lighttight cassette for housing a single stimulable phosphor sheet therein, thereafter fed to the image read-out apparatus in the form housed in the cassette, taken out of the cassette in the image read-out apparatus, and sent to an image read-out zone for carrying out image read-out.

In the case of the conventional built-in type radiation image recording and read-out apparatus, the stimulable phosphor sheet is circulated through the image recording step, the image read-out step and the erasing step in the apparatus, and therefore is not housed in a cassette. On the other hand, in the case where image recording and image read-out are carried out by use of an independent image recording apparatus and an independent image read-out apparatus, the stimulable phosphor sheet is first housed in a cassette, subjected to image recording in the image recording apparatus, and fed to the image read-out apparatus in the form housed in the cassette after image recording is finished. Therefore, the stimulable phosphor sheet processed in the built-in type radiation image recording and read-out apparatus and the stimulable phosphor sheet processed in the other type of the apparatus have to be substantially discriminated from each other, and it is not always possible to feed the stimulable phosphor sheet having a radiation image recorded thereon in the image recording apparatus to the built-in type radiation image recording and read-out apparatus and carry out image read-out from the sheet therein, or to take out the stimulable phosphor sheet, on which image recording has been carried out in the built-in type radiation image recording and read-out apparatus, from the built-in type apparatus and feed it to the external image read-out apparatus. Accordingly, it has heretofore been impossible to use the built-in type radiation image recording and read-out apparatus together with the independent image recording apparatus and/or the independent image read-out apparatus and to utilize only the image recording function or the image read-out function of the built-in type radiation image recording and read-out apparatus.

SUMMARY OF THE INVENTION

The primary object of the present invention is to provide a built-in type radiation image recording and read-out apparatus which has a configuration for receiving a stimulable phosphor sheet having a radiation image stored thereon by use of an external image recording apparatus and reading out the radiation image from the stimulable phosphor sheet, or feeding a stimulable phosphor sheet having a radiation image stored thereon in the built-in type radiation image recording and read-out apparatus to an external image read-out apparatus.

Another object of the present invention is to provide a built-in type radiation image recording and read-out apparatus adapted for use as an image recording apparatus or an image read-out apparatus.

The present invention provides a radiation image recording and read-out apparatus comprising:

(i) an image recording section provided with a cassette holding means for releasably holding a cassette capable of housing a stimulable phosphor sheet therein at a position for recording a radiation image on said stimulable phosphor sheet by exposing said stimulable phosphor sheet in said cassette to a radiation carrying image information, and a sheet take-out means for taking out said stimulable phosphor sheet from said cassette, (ii) an image read-out section provided with a stimulating ray source for emitting stimulating rays for scanning a stimulable phosphor sheet carrying a radiation image stored thereon, and a photoelectric read-out means for detecting light emitted by said stimulable phosphor sheet scanned with the stimulating rays to obtain electric image signals, (iii) an erasing section for, prior to the next image recording on said stimulable phosphor sheet for which the image read-out has been carried out at said image read-out section, having said stimulable phosphor sheet release the radiation energy remaining on said stimulable phosphor sheet, and (iv) a circulation and conveyance means for receiving said stimulable phosphor sheet from said sheet take-out means at said image recording section, conveying said stimulable phosphor sheet to said image read-out section and said erasing section in this order, and thereafter feeding said stimulable phosphor sheet into said cassette held at said image recording section.

With the radiation image recording and read-out apparatus in accordance with the present invention wherein a cassette is releasably held at the image recording section, the same processing as in the ordinary built-in type radiation image recording and read-out apparatus can be carried out by conducting taking-out of the stimulable phosphor sheet from the cassette and feeding of the sheet thereinto, and circulating the sheet by the circulation and conveyance means. Also, a cassette housing a stimulable phosphor sheet having a radiation image stored thereon by use of an external image recording apparatus can be fed to the image recording section, and image read-out from the stimulable phosphor sheet can be carried out at the image read-out section. Further, the stimulable phosphor sheet on which image recording has been finished at the image recording section can be taken out from the image recording section in the form housed in the cassette, and can be sent to an external image read-out apparatus. Accordingly, the radiation image recording and read-out apparatus in accordance with the present invention can be utilized as an image recording apparatus or as an image read-out apparatus when necessary. Thus the present invention widens the scope of application of the built-in type radiation image recording and read-out apparatus, and markedly improves the practicability of the apparatus.

DESCRIPTION OF THE PREFERRED EMBODIMENTS

The present invention will hereinbelow be described in further detail with reference to the accompanying drawings.

Figure 1:
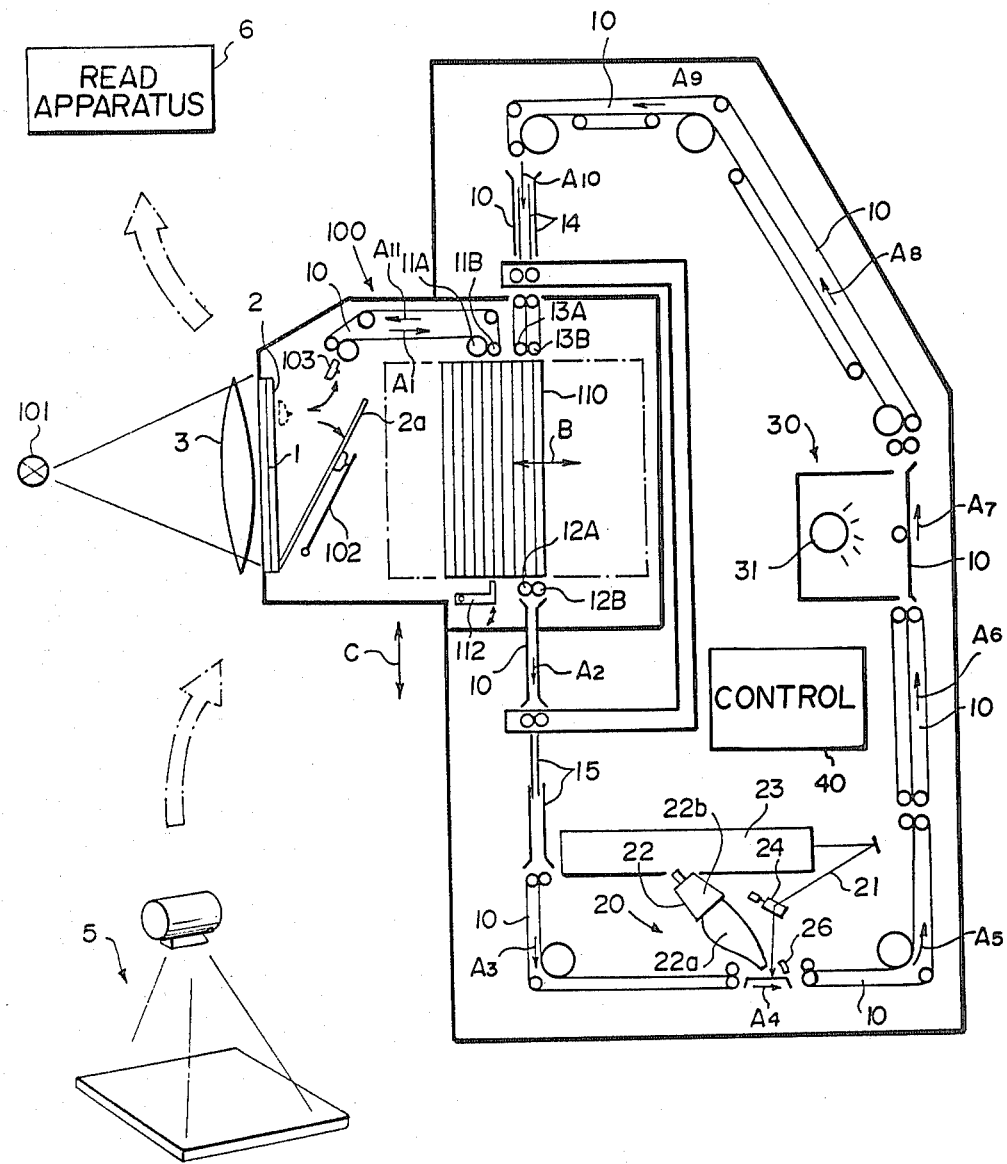
FIG. 1 is a schematic side view showing an embodiment of the radiation image recording and read-out apparatus in accordance with the present invention.

Referring to FIG. 1, an embodiment of the radiation image recording and read-out apparatus is provided with an image recording section 100 for releasably holding a cassette 2 capable of housing a stimulable phosphor sheet 1 therein and for carrying out image recording on the stimulable phosphor sheet 1, an image read-out section 20 for carrying out image read-out, and an erasing section 30 for erasing radiation energy remaining on the stimulable phosphor sheet 1 after the image read-out from the sheet 1 is finished. The stimulable phosphor sheet 1 housed in the cassette 2 fed to the image recording section 100 is taken out from the cassette 2 by a sheet take-out means as will be described later, conveyed by a circulation and conveyance means 10 constituted by endless belts, rollers, guide plates and the like to the image read-out section 20 and the erasing section 30 in this order, and then returned to the image recording section 100.

At the image recording section 100, the stimulable phosphor sheet 1 housed in the cassette 2 is exposed to a radiation emitted by a radiation source 101 and passing through an object 3, and a radiation image of the object 3 is stored on the sheet 1. After the image recording is finished, lock of the cassette 2 is released, and a rear cover 2a is sucked and opened by a suction means 102. When the rear cover 2a has been opened, a suction cup 103 as the sheet take-out means is moved from a position as indicated by the solid line to a position as indicated by the broken line in FIG. 1, sucks the sheet 1 in the cassette 2, and transfers the sheet 1 to the neighboring circulation and conveyance means 10. The image recording section 100 is provided with a stacker 110 capable of housing a plurality of stimulable phosphor sheets and feeding out the sheets one by one. The sheet 1 is conveyed by the circulation and conveyance means 10 in the direction as indicated by the arrow A1, and fed into the stacker 110. So that it can be brought to face the object 3, the image recording section 100 is moveable vertically as indicated by the arrow C by expansion and contraction of expansion guides 14 and 15 constituting a part of the circulation and conveyance means 10.

Figure 2:
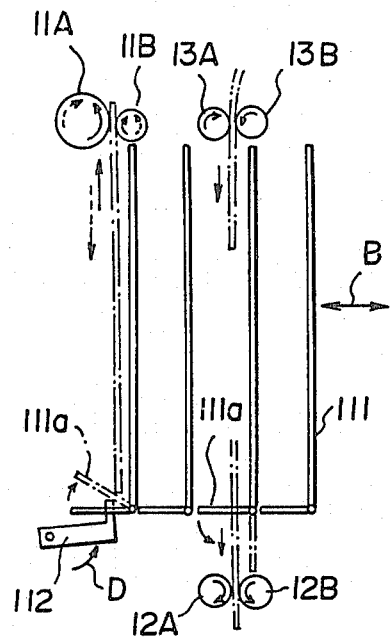
FIG. 2 is a schematic view showing the stacker in the embodiment of FIG. 1, and FIGS. 3 and 4 are schematic sectional views showing examples of cassette loading and unloading at the image recording section.

As shown in FIG. 2, the stacker 110 is provided with a plurality of trays 111, 111, . . . for housing the sheets 1, 1, . . . one by one therein. The trays 111, 111, . . . are housed in a tray housing member (not shown), and moved together with each other within the range as indicated by the chain line in FIG. 1 in the direction as indicated by the arrow B until a desired tray 111 is disposed below conveying rollers 11A and 11B for feeding the sheet 1 into the stacker 110. The conveying rollers 11A and 11B are rotated in the directions of the arrows as indicated by the broken lines in FIG. 2, and feed the sheet 1 into the tray 111. When the sheet 1 carrying the radiation image stored thereon is to be fed out of the tray 111, the stacker 110 is moved in the direction as indicated by the arrow B until the predetermined tray 111 holding the sheet 1 which is to be fed out is disposed above feed-out rollers 12A and 12B which are disposed below the stacker 110. Then, as shown in FIG. 2, a bottom plate 111a of the tray 111 is rotated from a position as indicated by the solid line to a position as indicated by the chain line, thereby to allow the sheet 1 to fall from the tray 111. The leading end portion of the falling sheet 1 is grasped between the feed-out rollers 12A and 12B, and the sheet 1 is fed out of the stacker 110. The sheet 1 fed out of the stacker 110 is conveyed by the circulation and conveyance means 10 in the directions as indicated by the arrows A2 and A3, and fed into the image read-out section 20.

At the image read-out section 20, the sheet 1 carrying a radiation image stored thereon is scanned with stimulating rays 21 such as a laser beam which cause the sheet 1 to emit light in proportion to the stored radiation energy, and the emitted light is photoelectrically detected by a photoelectric read-out means 22 constituted by a photomultiplier or the like to obtain electric image signals for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 1 towards a light guide member 22a of the photoelectric read-out means 22. The light guide member 22a guides the light through total reflection therein up to a photodetector 22b constituted by a photomultiplier or the like.

The sheet 1 sent to the image read-out section 20 is conveyed by the sheet conveyance means 10 in the direction as indicated by the arrow A4, and the whole surface of the sheet 1 is scanned two-dimensionally by the stimulating rays 21 deflected approximately normal to the conveyance direction. The light emitted by the sheet 1 during the scanning is detected by the photodetector 22b via the light guide member 22a. Image read-out is conducted in this manner. The image signals obtained by the image read-out are sent to an image processing circuit (not shown) for processing the image signals, and the processed image signals are sent to an image reproducing apparatus (not shown). The image reproducing apparatus may be a display device such as a CRT, or a recording device for carrying out light beam scanning and recording on a photographic film. Or, the image signals may be stored on a storage means such as a magnetic tape (not shown). The optical members at the image read-out section 20 are not limited to those mentioned above. For example, as proposed in Japanese Patent Application No. 60(1985)-156255, a long photomultiplier may be disposed along the main scanning line as the photoelectric read-out means, and the light emitted by the sheet 1 may be detected thereby without using the light guide member 22a.

After image read-out from the sheet 1 is finished at the image read-out section 20, the sheet 1 is conveyed by the circulation and conveyance means 10 in the directions as indicated by the arrows A5 and A6 to the erasing section 30.

At the erasing section 30, radiation energy remaining on the sheet 1 after the image read-out is conducted is erased. Specifically, a part of the radiation energy stored on the sheet 1 at the image recording step remains stored thereon after the image read-out is conducted. In order to reuse the sheet 1, the residual radiation energy is erased at the erasing section 30. Any erasing method may be employed at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the sheet 1 is exposed to the erasing light emitted by the erasing light sources 31, 31, . . . for releasing the residual radiation energy from the sheet 1 while the sheet 1 is conveyed in the direction as indicated by the arrow A7.

After erasing of the sheet 1 is finished at the erasing section 30, the sheet 1 is conveyed by the circulation and conveyance means 10 in the directions as indicated by the arrows A8, A9 and A10 to the image recording section 100 and fed into the stacker 110 at the image recording section 100.

Before the erased sheet 1 is fed into the stacker 110, the stacker 110 is moved in the direction as indicated by the arrow B until an empty tray 111 for receiving the erased sheet 1 is positioned below the feed-in rollers 13A and 13B provided above the stacker 110. The erased sheet 1 fed into the tray 111 is taken out of the tray 111 when necessary and fed into the cassette 2 for use in radiation image recording. At this time, the tray 111 housing the sheet 1 which is to be taken out is moved to the position below the conveying rollers 11A and 11B. A sheet push-up lever 112 is disposed at a position facing the conveying rollers 11A and 11B with the stacker 110 intervening therebetween. As shown in FIG. 2, the sheet push-up lever 112 is rotated in the direction as indicated by the arrow D to push up the bottom plate 111a of the tray 111 and move up the sheet 1 in the tray 111 until the upper end portion of the sheet 1 is grasped between the conveying rollers 11A and 11B. This time, the conveying rollers 11A and 11B are rotated in the direction as indicated by the solid line in FIG. 2, and the sheet 1 is conveyed in the direction as indicated by the arrow AII and fed into the cassette 2. The timing of feed-in of the sheet 1 taken out of the cassette 2 and the sheet 1 sent from the erasing section 30 into the stacker 110 and the timing of feed-out of the sheet 1 from the stacker 110 to the image read-out section 20 or to the cassette 2 can be adjusted arbitrarily. For example, in the case where a plurality of the erased sheets 1, 1, . . . are temporarily gathered in the stacker 110, they can be sequentially fed into the cassette 2 for successively carrying out image recording, and image-recorded sheets 1, 1, can be sequentially fed into the stacker 110 and made to wait therein. Also, it becomes possible to select a specific sheet 1 from the image-recorded sheets 1, 1, . . . and to preferentially send the specific sheet 1 to the image read-out section 20. In order to smoothly carry out feeding in and out of the sheet 1 in the stacker 110, it is necessary to provide a control means for controlling the timing of sheet conveyance by the circulation and conveyance means 10, for memorizing whether each tray 111 houses an erased sheet 1 or an image-recorded sheet 1 or is empty, and for moving a desired tray 111 to a desired position. For this purpose, a control section 40 is provided above the image read-out section 20 in this embodiment. The stacker 110 need not necessarily be provided in the case where the sheets 1, 1, . . . need not be made to wait before and after the image recording and are processed in regular order repeatedly.

Figure 3:
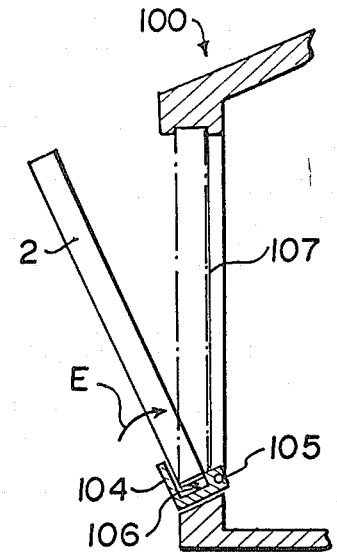

In the aforesaid embodiment, a plurality of the sheets 1, 1, . . . can be circulated and used repeatedly in the apparatus with a single cassette 2 being held at the image recording section 100. Also, since the cassette 2 is releasably held at the image recording section 100, the cassette 2 can be taken out of the image recording section 100 and sent to an external image recording apparatus 5 or an external image read-out apparatus 6. By way of example, loading and unloading of the cassette 2 at the image recording section 100 are carried out as shown in FIG. 3.

Figure 4:
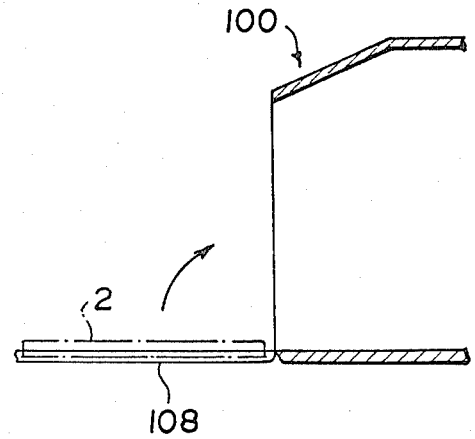

The front surface of the image recording section 100 facing the radiation source 101 is provided with an opening 107 having a size approximately equal to the size of the cassette 2. A lower end portion of the opening 107 is provided with a supporting base 104 for supporting the cassette 2. The supporting base 104 is rotatable around a shaft 105, and supports the cassette 2 via a spring 106. When the cassette 2 is to be fed to the image recording section 100, the cassette 2 is placed on the supporting base 104, and then the supporting base 104 is rotated in the direction as indicated by the arrow E. As a result, the cassette 2 is engaged with and held in the opening 107 with the spring 106 being contracted. When the cassette 2 is to be taken out, the supporting base 104 is pulled out to the position shown with the spring 106 being further contracted. Loading and unloading of the cassette 2 at the image recording section 100 may be carried out in any other method. For example, as shown in FIG. 4, a door member 108 formed of a lighttight and radiation-permeable material may be disposed at the image recording section 100, the cassette 2 may be held by the door member 108, and loading and unloading of the cassette 2 may be effected by opening and closing the door member 108.

In the aforesaid embodiment wherein the cassette 2 is releasably held at the image recording section 100, the sheet 1 housed in the cassette 2 can be circulated and reused in the apparatus in the manner as mentioned above. Also, as shown in FIG. 1, a cassette housing a stimulable phosphor sheet having a radiation image stored thereon by use of the external image recording apparatus 5 can be fed to the image recording section 100, and only the image read-out and the erasing can be carried out in the radiation image recording and read-out apparatus. Further, the cassette 2 housing the sheet 1 having a radiation image stored thereon at the image recording section 100 can be taken out from the image recording section 100, and sent to the external image read-out apparatus 6 for carrying out the image read-out. Accordingly, it is possible to utilize only a specific function of the built-in type radiation image recording and read-out apparatus, and processing by the apparatus becomes more flexible. Also, even though a failure arises with the image recording section 100 or the image read-out section 20, the image recording operation or the image read-out operation can be achieved by use of the external image recording apparatus 5 or the external image read-out apparatus 6.

I claim:

1. A radiation image recording and read-out apparatus comprising:
   (i) an image recording section provided with a cassette holding means for releasably holding a cassette capable of housing a stimulable phosphor sheet therein at a position for recording a radiation image on said stimulable phosphor sheet by exposing said stimulable phosphor sheet in said cassette to a radiation carrying image information, and a sheet take-out means for taking out said stimulable phosphor sheet from said cassette,
   (ii) an image read-out section provided with a stimulating ray source for emitting stimulating rays for scanning a stimulable phosphor sheet carrying a radiation image stored thereon, and a photoelectric read-out means for detecting light emitted by said stimulable phosphor sheet scanned with the stimulating rays to obtain electric image signals,
   (iii) an erasing section for, prior to the next image recording on said stimulable phosphor sheet for which the image read-out has been carried out at said image read-out section, having said stimulable phosphor sheet release the radiation energy remaining on said stimulable phosphor sheet, and (iv) a circulation and conveyance means for receiving said stimulable phosphor sheet from said sheet take-out means at said image recording section, conveying said stimulable phosphor sheet to said image read-out section and said erasing section in this order, and thereafter feeding said stimulable phosphor sheet into said cassette held at said image recording section.

2. An apparatus as defined in claim 1 wherein said image recording section is provided with a stacker capable of housing a plurality of said stimulable phosphor sheets and feeding out the housed stimulable phosphor sheets one by one.

3. An apparatus as defined in claim 2 wherein said stacker comprises:
   (a) a tray housing member and a plurality of trays disposed in said tray housing member for holding said stimulable phosphor sheets respectively in a supported position,
   (b) a feed-in means provided above said tray housing member for feeding said stimulable phosphor sheet fed by said circulation and conveyance means into said tray housing member,
   (c) a feed-out means provided under said tray housing member for receiving said stimulable phosphor sheet discharged out of said tray housing member and conveying said stimulable phosphor sheet into said circulation and conveyance means, and
   (d) a moving means for moving said tray housing member so that every tray in said tray housing member can be brought under said feed-in means and above said feed-out means.

4. An apparatus as defined in claim 3 wherein each of said trays is provided with a bottom plate moveable among a first position to receive the lower end of said stimulable phosphor sheet and hold said stimulable phosphor sheet in the tray, a second position rotated downward from the first position to allow the stimulable phosphor sheet to fall by its weight and discharge it out of said tray housing member, and a third position rotated upward from the first position to push up the lower end of said stimulable phosphor sheet and discharge said stimulable phosphor sheet out of said tray housing member.

5. An apparatus as defined in claim 4 wherein said stacker further comprises a sheet push-up means for pushing up said bottom plate to move up the lower end of said stimulable phosphor sheet and discharge said stimulable phosphor sheet out of said tray housing member.

6. An apparatus as defined in claim 1 wherein said image recording section is moveable vertically.

7. An apparatus as defined in claim 1 wherein said cassette holding means comprises an opening which is formed in a front surface of said image recording section facing a source of said radiation and which has a size approximately equal to the size of said cassette, and a supporting base disposed at a lower end portion of said opening and rotatable between a first position to support said cassette in said opening and a second position rotated outward from the first position to receive said cassette fed to said supporting base.

8. An apparatus as defined in claim 1 wherein said cassette holding means comprises a lighttight, radiation-permeable door member disposed to constitute a front surface of said image recording section facing a source of said radiation and rotatable between a first position to support said cassette at said front surface and a second position rotated outward from the first position to receive said cassette fed onto said door member.

* * * * *